3,556,768
METHOD FOR INHIBITING GROWTH OF WEED AND GRASSES IN RICE PADDIES
Takayuki Inoue, Kichiro Kato, Teruhiko Toyama, and Tetsuo Yanami, Ohmuta-shi, Japan, assignors to Mitsui Toatsu Chemicals, Inc., Tokyo, Japan, a corporation of Japan
No Drawing. Filed Apr. 4, 1967, Ser. No. 628,271
Claims priority, application Japan, Apr. 11, 1966, 41/22,445
Int. Cl. A01n 9/20
U.S. Cl. 71—118                 1 Claim

ABSTRACT OF THE DISCLOSURE

A herbicidal composition not toxic to fish containing as an active ingredient at least one compound represented by the formula:

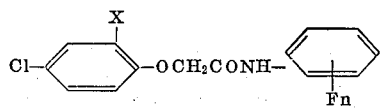

wherein X is a member selected from the group consisting of chlorine atom and methyl radical, and $n$ is an integer of 1 or 2, and a method for inhibiting growth of weeds and grasses by using the above composition.

---

This invention concerns a herbicidal composition not toxic to fish containing as an active ingredient in a herbicidally effective amount at least one compound expressed by the general formula:

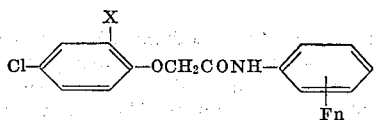

wherein X is a member selected from the group consisting of chlorine atom and methyl radical, and $n$ is an integer of 1 or 2, and a herbicidal method in which the said composition is used.

The compound of the above general formula is obtained, for instance, by condensing 2,4-dichlorophenoxyacetic acid or 2-methyl-4-chlorophenoxyacetic acid (hereinafter to be abbreviated as MCP) with fluoro (or difluoro) aniline, and is a compound belonging to a group of phenoxyacetanilides.

It is known that among the phenoxyacetanilides, those in which a methyl, trifluoromethyl, lower alkoxy, nitro radical or chlorine atom is introduced to the phenyl nucleus of the anilide group have herbicidal activity. But only 2-methyl-4-chlorophenoxyaceto-o-chloroanilide where a chlorine atom is introduced into the 2-position of the phenyl nucleus of the anilide group is actually used as an active ingredient of a herbicide (marketed under the name of MCPCA herbicide). This compound (hereinafter abbreviated as MCPCA) can be obtained by condensing MCP with o-chloroaniline. MCPCA, compared with MCP, only weakly acts on grown plants, and moves less in the soil. The application of theses composition of this compound to a rice paddy field in an early stage does not therefore give any harm to the rice paddy and can effect the eradication of weeds. In general, it is applied to a rice paddy field at an early stage in an amount calculated as the active ingredient of about 7.5 g. per are. As, however, the herbicidal action of this composition is substantially the same as MCP, the application in the said amount is not sufficiently effective on weeds of the grass family, particularly barnyard grasses which most prevail in a rice paddy field, although it is effective on the broad-leafed plants. Furthermore, this composition often impedes the growth of rice paddy because it inhibits the growth of offshoot or gives rise to malformation of rice paddy by hormonic action depending upon the temperature at the time of application and the soil conditions of the locus to which the said composition is applied. For these reasons, the application of this composition is disadvantageously limited in respect of the time and area. This herbicidal composition is less toxic to fish than PCP herbicide, but when applied to a rice paddy field, comes to have a concentration in water of the paddy field of more than 10 times as much as an anticipated safe concentration against fish and shellfish. Therefore, safety to fish and shellfish cannot sufficiently be assured.

Accordingly, the object of this invention is to remove such defects of the known phenoxyacetoanilide type herbicides, namely, lack of herbicidal action and also lack of safety to crops and fish and shellfish. The inventors for this application synthesized many phenoxyacetoanilides for this purpose, and studied their adaptability as herbicides. As a result, they discovered that the compound of the said general formula wherein 1 or 2 fluorine atoms are introduced into the phenyl nucleus of the anilide group has the following characteristics over MCPCA, and arrived at this invention.

(1) The compounds of this invention have roughly the same activity as that of MCPCA on the grown plants, but over twice as strong activity on weed seeds before and after budding and on young weeds.

(2) Thus, the amount of the said compounds to be used may sufficiently be less than ½ of that of MCPCA, and the safety to grown crops is larger.

(3) That the amount to be used is small means that the concentration of these compound in water of a rice paddy field is low, and safety to fish and shellfish is increased since the toxicity of the compound itself to fish and shellfish is less than ⅒ of that of MCPCA.

In general, the behaviour of fluorine in a phenyl group is considerably different from those of other halogens. In fact, a fluorinated phenyl compound cannot be obtained by substituting fluorine atom for hydrogen atom in the phenyl group, and generally its synthesis is not easy. Accordingly few herbicides with fluorinated phenyl nucleus have been known. When hydrogen or chlorine atoms of the chlorinated phenyl compound are substituted with 1 or 2 fluorine atoms, the heribicidal activity of those substituted compounds cannot be anticipated from that of the original compound. This fact is obvious from the following instances:

(1) 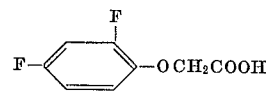

is weaker than

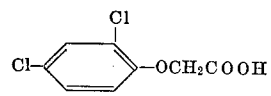

(2) 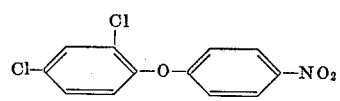 is stronger than

Cl—⟨⟩—O—⟨⟩—NO₂

(3)

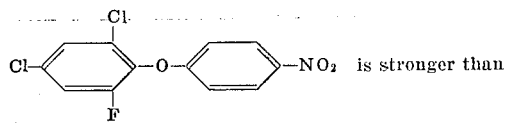 is stronger than

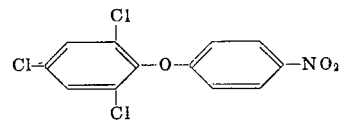

(4)

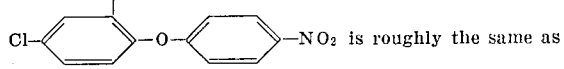 is roughly the same as

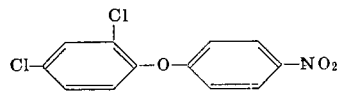

Therefore the herbicidal effect of the compounds having 1 or 2 fluorine atoms in the phenyl nucleus of the anilide group can be confirmed only by experimental investigation, and it cannot be anticipated at all from the effect of MCPCA although both compounds are similar in respect of chemical structure.

Furthermore, herbicidal compound of the structure wherein a trifluoromethyl group is introduced to the phenyl nucleus of the anilide group have also been known. In this compound, a fluorine atom is bound to the carbon atom of the methyl group introduced to the phenyl nucleus, and it is structurally different from the compound of this invention wherein a fluorine atom is directly bound to the carbon atom of the phenyl nucleus. Hence, they have substantially nothing to do with each other in respect of activity on the living body.

Specific examples of the compound of this invention expressed by the said general formula are as follows:

(I) 2,4-dichlorophenoxyaceto-o-fluoroanilide

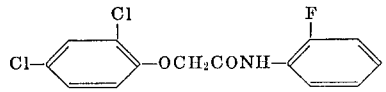

(II) 2,4-dichlorophenoxyaceto-p-fluoroanilide

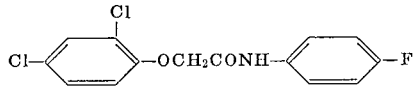

(III) 2,4-dichlorophenoxyaceto-2,5-difluoroanilide

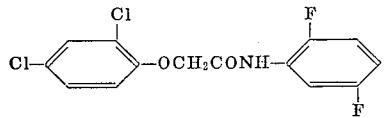

(IV) 2-methyl-4-chlorophenoxyaceto-m-fluoroanilide

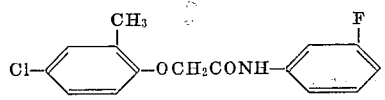

(V) 2-methyl-4-chlorophenoxyaceto-p-fluoroanilide

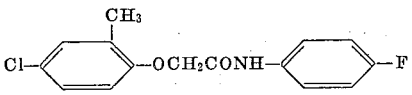

(VI) 2-methyl-4-chlorophenoxyaceto-3,4-difluoroanilide

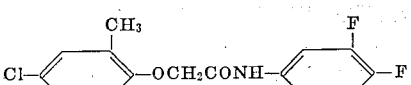

These compounds can be synthesized by condensing 2,4-dichlorophenoxy acetic acid or MCP with aniline having 1 or 2 fluorine atoms at the phenyl nucleus in the presence of a dehydrating agent. The starting fluoroaniline or difluoroaniline can be manufactured at relatively high yields by effecting halogen-exchange reaction of chloronitrobenzene or dichloronitrobenzene in a suitable solvent such as dimethyl sulfoxide with the use of a suitable fluorinating agent such as potassium fluoride, and then reducing the reaction product.

The features of this invention will be explained by the following test examples.

Test Example 1—(Test in activity on plants)

Ten parts by weight of sodium alkylbenzenesulfonate and 60 parts by weight of clay were incorporated into 30 parts by weight of each of the said compounds (I) to (VI) and MCPCA as control. The mixture was finely pulverized to make a wettable powder. It was diluted to 300 and 1000 times the original amount and made into a homogeneous suspension with a compound concentration of 1000 p.p.m. and 300 p.p.m.

Wooden boxes with a size of 20 cm. x 25 cm. were filled with soil. Rice paddy, barnyard grass, rape and tomato seeds were respectively sown thereon, and lightly covered with soil and pressed. Ten cubic centimeters of the said suspension were sprayed thereon next day (treatment before budding) or 15 days later (treatment during a growing period). After the lapse of 15 days, the damage of each crop was observed. The results are shown in Table 1.

TABLE 1

| Compound | Concentration of spray suspension (p.p.m.) | Treatment before budding | | | | Treatment during a growing period | | | |
|---|---|---|---|---|---|---|---|---|---|
| | | Rice paddy | Barnyard grass | Rape | Tomato | Rice paddy | Barnyard grass | Rape | Tomato |
| I | 1,000 | +++ | +++ | +++ | +++ | ± | + | +++ | +++ |
| I | 300 | ++ | +++ | +++ | +++ | − | − | +++ | +++ |
| II | 1,000 | +++ | +++ | +++ | +++ | ± | + | +++ | +++ |
| II | 300 | ++ | +++ | +++ | +++ | − | ± | +++ | +++ |
| III | 1,000 | ++ | +++ | +++ | +++ | − | ± | +++ | +++ |
| III | 300 | ++ | ++ | +++ | +++ | − | − | +++ | +++ |
| IV | 1,000 | +++ | +++ | +++ | +++ | ± | − | ++ | +++ |
| IV | 300 | +++ | +++ | +++ | +++ | − | − | ++ | +++ |
| V | 1,000 | +++ | +++ | +++ | +++ | ± | − | +++ | +++ |
| V | 300 | +++ | +++ | +++ | +++ | − | − | ++ | +++ |
| VI | 1,000 | +++ | +++ | +++ | +++ | − | + | ++ | +++ |
| VI | 300 | ++ | ++ | +++ | +++ | − | − | ++ | +++ |
| MCPCA | 1,000 | ++ | ++ | +++ | +++ | ± | ± | ++ | +++ |
| MCPCA | 300 | ± | ± | ++ | ++ | − | − | ++ | ++ |

*Degree of damage: +++=big; ++=intermediate; +=small; ±=slight; −=none.

It has been clear from the test results that the compound used as active ingredient in this invention exhibits an action same as or higher than that of an MCPCA spray solution with a concentration of 1000 p.p.m. when applied to both the plants of grass family (rice paddy and barnyard grass) and broad-leafed plants (rape and tomato) as a spray solution with a concentration of 300 p.p.m. in treatment before budding, and with respect to the herbicidal action on the seeds or young seedlings, it has three times as large an effect as that of MCPCA.

On the other hand, in the treatment during a growing period, the compounds of the present invention act strongly upon broad-leafed plants, but hardly give harm to the weeds of grass family, especially rice paddy when applied as a solution of 1000 p.p.m. concentration as in the case of control MCPCA and are quite harmless when applied as a 300 p.p.m. solution. The foregoing means that the herbicide of this invention is not phytotoxic to grown plants of the grass family by application in an amount less than 1/3 of that of the known herbicide MCPCA, and can kill or inhibit the growth of weeds of the grass family before or after budding and the broad-leafed plants before and after budding or in a grown stage.

It is clear therefore that the compound of this invention is suitable as a herbicide for a rice paddy field.

Text Example 2.—(Test in eradicating the weeds in a rice paddy field and in toxicity to fish)

A pot of 1/2000 are was packed with a sandy soil, and the seeds of barnyard grass and pickerel weed were mixed with the soil at the place 3 cm. deep from the surface. Water was filled therein, and 3 days later, rice paddy seedlings (variety being Ariake) were transplanted. After the lapse of 4 days, granular compositions containing 2.5% by weight of each of the said compounds (I), (V) and MCPCA were applied in an amount of 0.1 kg., 0.2 kg. and 0.4 kg. per are respectively (2.5 g., 5.0 g. and 10.0 g. per are respectively calculated as active ingredient).

While the water was being leaked from the bottom of the pot so that the depth of the water might be decreased at a rate of 3 cm. per day, the pot was maintained for 20 days outdoors at the temperature of 16 to 24° C. The amount of the barnyard grasses and pickerel weeds remaining in the pot was examined. The results are shown in Table 2.

To examine the toxicity to fish, glass vessels with a diameter of 30 cm. were filled with 10 liters of water. Each of the said granular compositions was put thereinto in an amount of 8 g., 4 g., 2 g., 1 g. and 0.5 g. respectively to make a solution each having a concentration calculated as active ingredient of 20 p.p.m., 10 p.p.m., 5 p.p.m., 2.5 p.p.m. and 1.25 p.p.m. Then young carp were put into each of the so prepared solutions with the temperature maintained at 20 to 22° C. The mortality of the carp examined after the lapse of 48 and 120 hours respectively is shown in Table 3.

TABLE 3

| Concentration of active ingredient (p.p.m.) | Mortality of carp | | | | | |
|---|---|---|---|---|---|---|
| | Compound I (granules) | | Compound V (granules) | | MCPCA (granules) | |
| | 48 hours later | 120 hours later | 48 hours later | 120 hours later | 48 hours later | 120 hours later |
| 20 | 0 | 10 | 0 | 20 | 100 | 100 |
| 10 | 0 | 0 | 0 | 0 | 100 | 100 |
| 5 | 0 | 0 | 0 | 0 | 80 | 100 |
| 2.5 | 0 | 0 | 0 | 0 | 50 | 70 |
| 1.25 | 0 | 0 | 0 | 0 | 30 | 40 |
| 0 | 0 | 0 | 0 | 0 | 0 | 0 |

It can be understood from Table 2 that the herbicidal composition of this invention can effectively eradicate barnyard grasses and pickerel weeds by an application of 2.5 to 5.0 g. per are calculated as active ingredient under the said soil conditions and circumstances, and does no harm to rice paddy. On the other hand, the known herbicide MCPCA is effective on pickerel weeds, but is only insufficiently effective on barnyard grasses even if applied in an amount calculated as active ingredient of 10.0 g. per are. Furthermore, the herbicidal composition of MCPCA considerably impedes the growth of rice paddy when used in the said amounts. It is clear from Table 3 that the herbicide of this invention hardly exhibits toxicity to fish if used at an active ingredient concentration of 20 p.p.m., and is completely harmless if used at an active ingredient concentration of 10 p.p.m., whereas the control MCPCA exhibits toxicity so strong as to kill almost half of the carp when used at a concentration of 1.25 p.p.m. This means that the toxicity of the herbicide of this invention to fish is less than 1/10 of that of MCPCA.

In short, it is possible to kill or inhibit the growth of weeds in a rice paddy field of sandy soil at about 20° C. by applying the herbicide of this invention in an amount of 2.5 to 5.0 g. per are calculated as active ingredient. Moreover, the concentration of the active ingredient in the water is only 0.5 to 1 p.p.m. if the depth of water is 5 cm., and so there is no fear of toxicity to fish.

The herbicidal composition of this invention contains as an active ingredient at least one of the said compounds, and is used in the form of dust, granule, wettable powder, emulsion, solution, etc. by incorporating thereinto at least one adjuvant used generally in agricultural chemicals such as solid carriers, liquid carriers and surface active agents.

Furthermore, it is permissible to add another herbicidal component as the active ingredient or various agricultural chemicals other than herbicides and fertilizers.

The most suitable amount of the herbicidal composition of this invention is 2.5 to 5.0 g. per are calculated as the active ingredient, but may be 1.0 to 10.0 g. depending upon the method of application or the objects to which it is applied.

Now, examples of the preparation of the herbicidal

TABLE 2

| Amount of active ingredient (g./a.) | Compound I (granules) | | | Compound V (granules) | | | MCPCA (granules) | | |
|---|---|---|---|---|---|---|---|---|---|
| | Remaining number | | | Remaining number | | | Remaining number | | |
| | Barnyard grass | Pickerel weed | Phytotoxicity | Barnyard grass | Pickerel weed | Phytotoxicity | Barnyard grass | Pickerel weed | Phytotoxicity |
| 10.0 | 0 | 0 | Observed. | 0 | 0 | Observed. | 15 | 0 | Observed. |
| 5.0 | 5 | 1 | None | 0 | 0 | None | 24 | 5 | Slightly observed. |
| 2.5 | 19 | 13 | do | 7 | 2 | do | 50 | 33 | None. |
| 0 | 56 | 71 | do | 56 | 71 | do | 56 | 71 | Do. | composition of this invention will be given below in which all parts are by weight.

Preparation Example 1

| | Parts |
|---|---|
| 2,4-dichlorophenoxyaceto-o-fluoroanilide | 1 |
| Kaolin | 39 |
| Talk | 50 |

The above components were mixed and pulverized, and made into dust.

Preparation Example 2

| | Parts |
|---|---|
| 2-methyl-4-chlorophenoxyaceto-p-fluoroanilide | 1.5 |
| Gamura benzenehexachloride (γ-BHC) | 6 |
| Calcium ligninsulfonate | 2.5 |
| Bentonite | 90 |

The above-mentioned components were pulverized and mixed, and made into granules by addition of a suitable amount of water. After drying, granules with 20 to 60 mesh were obtained.

Example 3

| | Parts |
|---|---|
| 2-methyl-4-chlorophenoxyaceto-o-fluoroanilide | 20 |
| 2-methyl-4-chlorophenoxyaceto-p-fluoroanilide | 30 |
| Sodium alkylbenzenesulfonate | 5 |
| Clay | 45 |

The above components were uniformly mixed and pulverized, and made into a wettable powder.

Example 4

| | Parts |
|---|---|
| 2,4-dichlorophenoxyaceto-3,4-difluoroanilide | 5 |
| 2,4-dichlorophenyl-4-nitrophenyl ether | 20 |
| Emulsifier | 5 |
| Xylene | 70 |

The above-mentioned components were mixed and dissolved to make an emulsion.

What is claimed:
1. A method for inhibiting growth of weeds and grasses in rice paddies without injuring fish which comprises applying to the locus to be protected from weeds and grasses in an amount sufficient to exert herbicidal action thereon and at a rate from about 1.0 to about 10.0 grams per are, at least one compound represented by the formula:

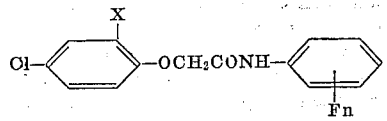

wherein X is a member selected from the group consisting of chlorine atom and methyl radical, and $n$ is an integer of 1 or 2.

References Cited

UNITED STATES PATENTS

| 3,439,018 | 4/1969 | Brookes et al. | 71—118 |

FOREIGN PATENTS

| 23,675 | 10/1965 | Japan | 71—118 |
| 1,041,982 | 9/1966 | Great Britain | 71—118 |
| 13,791 | 7/1964 | Japan | 71—118 |

OTHER REFERENCES

Thompson et al., Botanical Gazette, vol. 107, pp. 475 to 507 (pp. 486, 493, 494, 495, 497, 498 and 503 relied on).

JAMES O. THOMAS, Jr., Primary Examiner

U.S. Cl. X.R.

260—559

UNITED STATES PATENT OFFICE
CERTIFICATE OF CORRECTION

Patent No. 3,556,768     Dated January 19, 1971

Inventor(s) Takayuki Inoue et al

It is certified that error appears in the above-identified patent and that said Letters Patent are hereby corrected as shown below:

Claim 1, in the formula change "Ol" to "Cl".

Signed and sealed this 30th day of March 1971.

(SEAL)
Attest:

EDWARD M. FLETCHER, JR.
Attesting Officer

WILLIAM E. SCHUYLER, J
Commissioner of Patent